United States Patent

[11] 3,595,365

[72] Inventor Alphonse W. Faure
 Philadelphia, Pa.
[21] Appl. No. 20,547
[22] Filed Mar. 18, 1970
[45] Patented July 27, 1971
[73] Assignee C. S. S. Machine & Tool Co., Inc.
 Philadelphia, Pa.

[54] GEAR DRIVE FOR 90 DEGREE PUSH-OUT FOR GLASSWARE FORMING APPARATUS
 11 Claims, 8 Drawing Figs.
[52] U.S. Cl. .................................................. 198/24
[51] Int. Cl. ........................................... B65g 47/00
[50] Field of Search .................................. 198/20, 24, 25

[56] References Cited
UNITED STATES PATENTS
3,400,802 10/1968 Rowe .......................... 198/24
3,479,794 11/1969 Osterdahl ...................... 198/24

Primary Examiner—Richard E. Aegerter
Attorney—Paul and Paul

ABSTRACT: For glassware forming apparatus, a gear drive is provided for connecting the main horizontal drive shaft, which rotates continuously in one direction, to a vertical output shaft to oscillate the output shaft, on which the fluid motor for the 90° pushout is mounted, through an angle of approximately 90° for oscillating the 90° pushout fluid motor assembly through a corresponding 90° arc to sweep glassware articles from a dead plate through an arcuate path on to a continuously moving conveyor. The gear drive for oscillating the vertical shaft through 90°, also controls the delivery of air pressure to the fluid motor, through one air line or the other, in timed relation with the oscillating movement of the vertical shaft. Adjustment means are provided which permit adjusting the angle of the oscillating movement of the vertical shaft to slightly more or less than 90°, as desired, as well as for adjusting the orientation of the angle of oscillatory movement, without stopping the machinery.

INVENTOR.
Alphonse W. Faure

BY

Paul + Paul

ATTORNEYS.

INVENTOR.
Alphonse W. Faure
BY
Paul + Paul
ATTORNEYS.

INVENTOR.
Alphonse W. Faure 3,595,365

GEAR DRIVE FOR 90 DEGREE PUSH-OUT FOR GLASSWARE FORMING APPARATUS

BACKGROUND OF THE INVENTION

The present invention relates to apparatus for forming and handling newly formed glassware, and particularly to the apparatus for moving the newly formed glassware from the dead plate on to the moving conveyor through an arcuate path at a speed substantially equal to the conveyor speed. Such apparatus ordinarily includes a fluid motor having an extensible and retractable part, which may be either a piston or the cylinder, means for extending and retracting the piston or cylinder, and means for moving the fluid motor, when its extensible part is extended, through an arc of the order of 90° to sweep the newly formed bottles or other glassware from the dead plate on to the adjacent moving conveyor. The extensible part is then retracted, after which the fluid motor is turned, in the opposite direction, through 90° to its original position. The extensible part is then again extended, and the cycle is repeated. The fluid motor is ordinarily mounted on a base which is secured to the vertical shaft which is oscillated through an angle of approximately 90°. In the prior art, the means for moving the vertical shaft through an oscillating motion of approximately 90° includes a pivot bracket fixed to the conveyor frame for supporting a cam follower which is driven by a cam fixed to the main horizontally disposed drive shaft. The vertical shaft, which carries the fluid motor assembly which is to be oscillated back and forth, carries at its lower end a sprocket which is driven by a chain one end of which is connected to the cam follower and the other end of which is connected by a tension return spring to the frame. Thus, as the cam on the horizontal drive shaft moves the cam follower back and forth, the sprocket chain is reciprocated back and forth, and in this manner the sprocket on the vertical shaft is oscillated back and forth, with the return spring providing the force in one direction.

SUMMARY OF THE PRESENT INVENTION

The object of the present invention is to provide a gear drive between the main horizontal drive shaft and the vertical oscillator shaft which avoids the use of a separate pivot bracket for carrying the cam follower, and which also avoids the use of a sprocket, chain and tension return spring for driving the oscillator shaft.

Another object is to provide better control of the oscillating motion than is provided by the spring return.

A further object is to provide a drive mechanism which can be adjusted during operation, without shutting down the equipment.

The foregoing objects are accomplished by providing, in a single housing, means which include a yoke which is driven positively in a reciprocating manner through an angle substantially less than 90° by a cam follower which is driven positively by a cam on the main horizontal drive shaft. The reciprocating or oscillating motion of the yoke oscillates a stub-shaft which carries a drive arm for driving a gear sector through spring-loaded means. The arc of the teeth on the gear sector has a relatively large radius. The gear sector is driven by the yoke through an angle substantially less than 90°. A full gear, having a small radius compared with that of the gear sector, is pinned to the vertical shaft which is to be oscillated through 90°. This gear is driven by the gear sector through 90°. Adjustable stop or limit screws are provided for controlling, within limits, the size of the angle through which the gear sector is moved, thereby to control, within limits, the size of the angle of oscillation of the vertical oscillatory shaft. The limit screws may also be adjusted to control the orientation of the angle of the oscillatory movement.

The yoke which is driven by the cam follower also drives a valve-spool shift lever. This controls the flow of air pressure to the fluid motor so that the fluid motor drives its extensible part through its extension and retraction strokes in proper time relationship to the oscillatory movement of the fluid motor assembly which is mounted on the oscillatory shaft.

BRIEF DESCRIPTION OF THE DRAWINGS

FIG. 1 shows the position of the 90° oscillatory vertical shaft which carries the base on which is mounted the oscillatory fluid motor assembly having an extensible and retractable piston the forward end of which carries a pusher plate and fingers for sweeping the bottle or other glassware from the dead plate to the adjacent conveyor belt which moves from left to right;

FIG. 2 indicates the overall assembly of the component parts which make up the gear drive connection of the present application;

FIG. 3 shows in section further details of the component parts of the drive means of the present application;

FIG. 4 shows the drive arm which is connected to the vertical stub shaft and the manner in which the drive arm, through spring-loaded bolts, drives the gear sector which in turn drives the full gear which is pinned to the vertical oscillator shaft;

FIG. 5 shows the vertical stub shaft to which is pinned the yoke which is driven by the cam follower. The yoke drives the pneumatic valve-spool shift lever to control the flow of compressed air to the fluid motor;

DESCRIPTION OF THE PREFERRED EMBODIMENT

Figure 1:
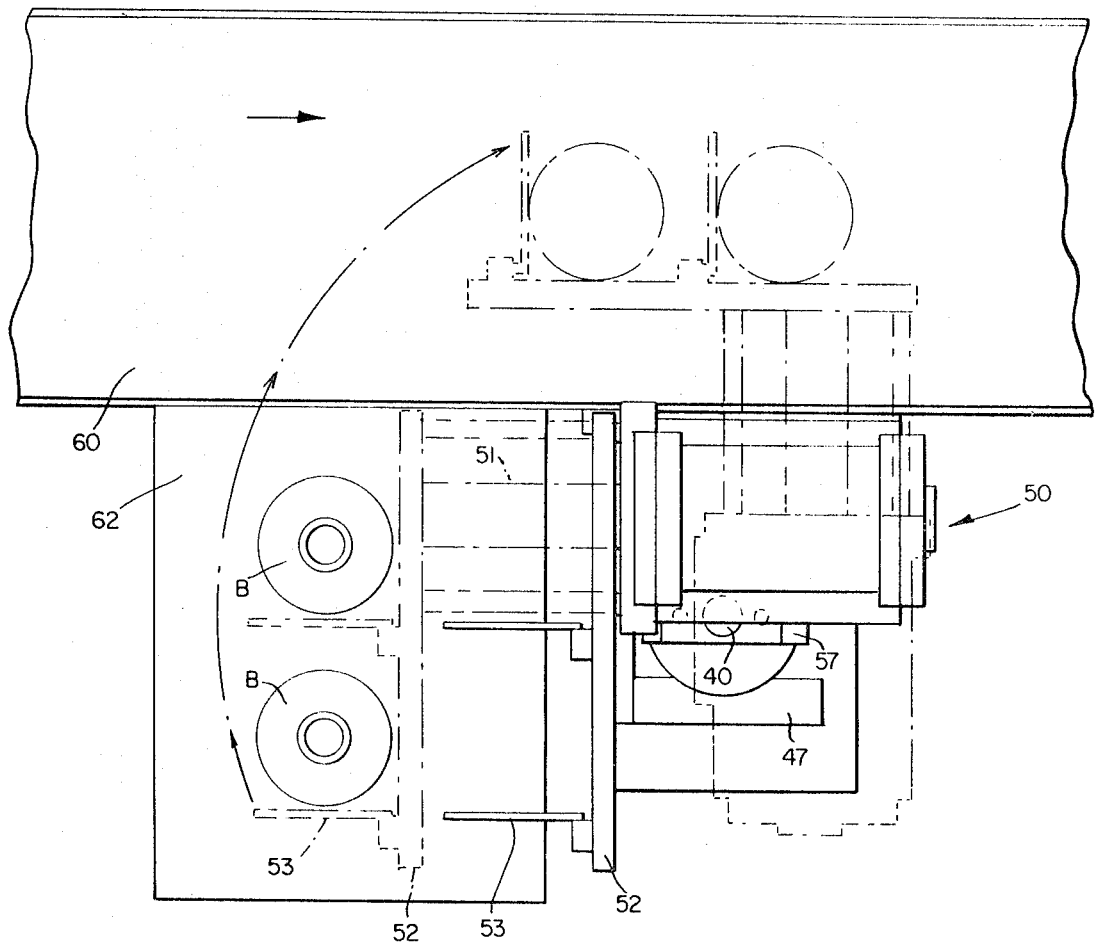
FIG. 1 is a diagrammatic plan view looking down on the conveyor belt.

FIG. 1 shows the general environment of the improved means provided by the present invention. In FIG. 1, the oscillatory vertical shaft 40 carries a circular baseplate 47 on which is mounted a fluid motor assembly 50 having a extensible and retractable piston 51 the forward end of which carries a pusher plate 52 having projecting therefrom fingers 53. When the shaft 40 is rotated clockwise through 90°, as viewed in FIG. 1, the fluid motor assembly 50 with piston 51 extended is carried therealong and the fingers 53 push the pair of bottles B along the arcuate path indicated by the dot-and-dash arrows on to the adjacent conveyor belt 60, which is moving from left to right as viewed in FIG. 1. After a momentary period to allow the conveyor belt 60 to move the bottles B away from the fingers 53, the piston 51 is retracted and the vertical shaft 40 is then rotated counterclockwise through 90° to return the fluid motor assembly 50 to the position shown in solid lines in FIG. 1. The piston 51 is then again extended and the cycle is repeated.

Figure 2:
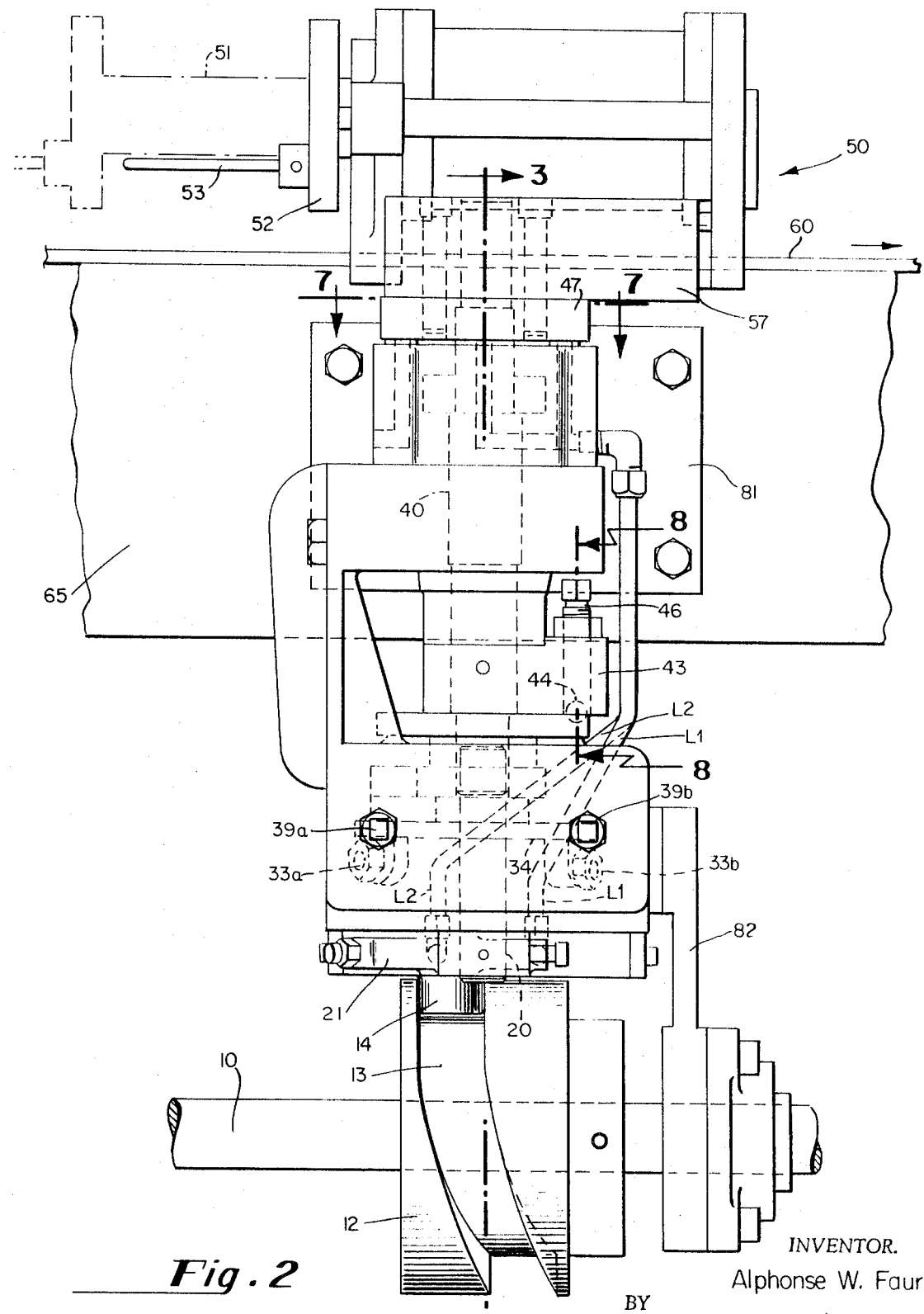
FIG. 2 is a front elevational view looking toward the conveyor frame, with the conveyor belt moving transversely from left to right.

FIG. 2 is an elevational view looking toward the side of the conveyor. The conveyor belt 60 is moving from left to right, as viewed in FIG. 2. The main drive shaft 10, which during operation of the apparatus rotates continuously, carries a cam 12 having a groove 13 in which rides a cam follower roller 14. In FIG. 2, as the main drive shaft 10 rotates, the cam follower roller 14 moves horizontally back and forth in the vertical plane of the drive shaft 10.

Figure 3:
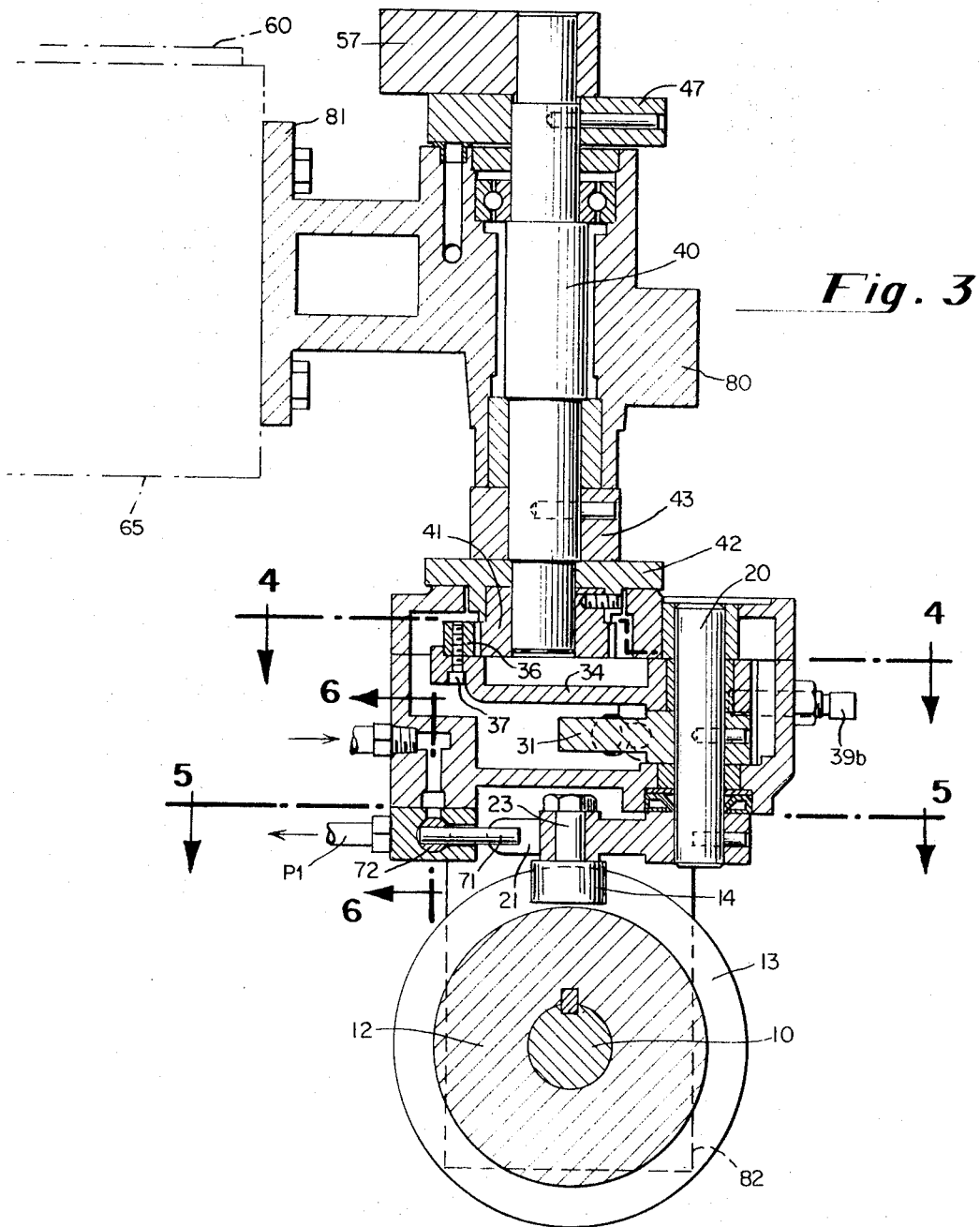
FIG. 3 is a side elevational view looking along the main horizontal drive shaft with the conveyor frame and conveyor belt located above and to the left.
Figure 4:
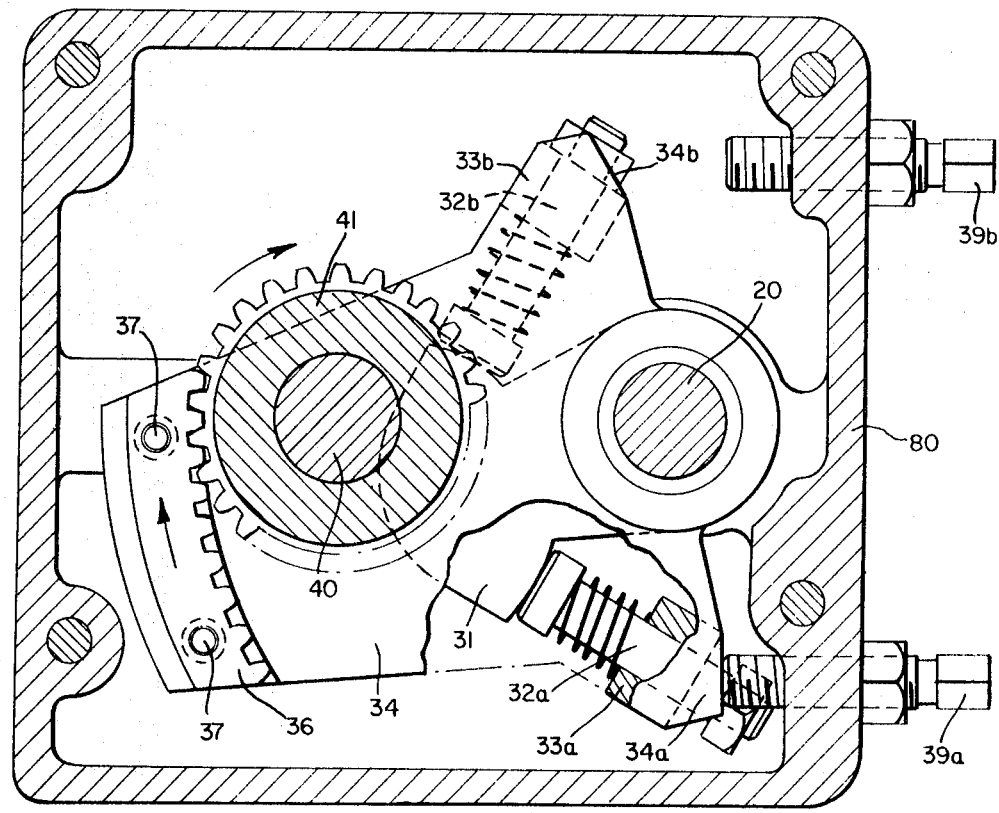
FIG. 4 is a view in section looking down along the line 4–4 of FIG. 3.

FIG. 3 is a view in section looking along the line 3–3 of FIG. 2. In FIG. 3, the cam follower 14 moves in and out of the paper in the vertical plane of the main horizontal drive shaft 10. The cam follower roller 14 is carried by a pin 23 secured to a yoke 21 which is driven by the cam roller 14 and which moves in and out of the paper, as viewed in FIG. 3. The yoke 21 is pinned to a stub shaft 20 and, accordingly, the stub shaft 20 is driven rotationally in an oscillatory manner. The angle of movement is, however, substantially less than 90°. Pinned to, and projecting from, the stub shaft is a drive arm 31, seen in greater detail in FIG. 4. This drive arm 31 bears against the heads of a pair of spring-loaded bolts 32a and 32b. These bolts are carried by a pair of arms 33a and 33b which project downwardly from a plate 34. Secured to the forward end of plate 34, the left end as seen in FIGS. 3 and 4, as by bolts 37, is a gear sector 36 the internal teeth of which mesh with the external teeth of a full gear 41 which is mounted free on the vertical shaft 40 which is driven in an oscillatory manner through approximately 90° by the gear mechanism now being described. The internal teeth of gear sector 36 are located on an arc whose radius is large compared with that of the full gear 41. Thus, oscillatory movement of gear sector 36 through an angle substantially smaller than 90° will oscillate the full gear 41 through an angle of 90°, or approximately 90° as determined by the adjustment means later to be described.

Figure 8:
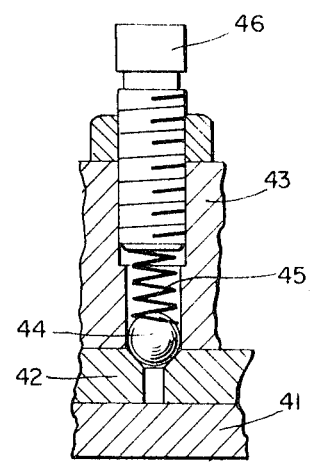
FIG. 8 is a detail showing of the ball detent clutch.

Secured to the full gear 41, as by setscrew, is a plate 42 which functions as the drive plate of a ball detent clutch the details of which are shown in FIG. 8. The driven member of the clutch assembly is a collar 43 which is pinned to the vertical oscillatory output shaft 40. The clutch drive plate 42 is coupled to the clutch collar 43 through a ball detent 44 which is held in a conical well or depression in the drive plate 42 by a heavy spring 45 whose compression is adjustable by an adjusting setscrew 46. The employment of a clutch between the driving gear 41 and the driven oscillatory output shaft 40 provides protection in the event the pushout mechanism should jam. If, for any reason, the oscillatory output shaft 40 is unable to move rotationally, the ball detent 44 will leave its depression against the force of the compression spring 45 and the damage to the equipment will be avoided.

In the manner just described, the vertical output shaft 40 is driven in an oscillatory manner through an angle of about 90° to move the fluid motor assembly 50 in a corresponding oscillatory manner. As indicated previously, the yoke 21 is driven by the cam follower 14 in a reciprocating fashion through an arc substantially smaller than 90°, and accordingly the stub shaft 20 oscillates through such smaller angle. The stub shaft 20 thus drives the gear sector 36 through the said substantially smaller angle but the gear sector 36 corresponds to a portion of a full gear whose diameter is much larger than that of the full gear 41. As a result, oscillatory movement of the gear sector 36 moves the full gear 41 through 90°, or approximately 90°. In this manner, gear 41 drives the vertical output shaft 40 through 90°, or approximately 90°.

Adjustment of the size of the angle to which the vertical output shaft 40 is driven, and also adjustment of the orientation or location of this angle, is provided by means now to be described. Such adjustment may, moreover, be made while the equipment is running.

The means by which the adjustments referred to above are accomplished are seen best in FIG. 4. It has been described previously how the drive arm 31 drives alternately against the head of one and then the other of the spring loaded bolts 32a, 32b, to drive the gear-sector plate 34 in reciprocating manner. The corner portions 34a, 34b of the gear-sector plate 34 are shaped to abut against the adjustable stop or limit screws 39a, 39b. Thus, by turning in one or the other, or both, of the limit screws, the angle through which the gear sector 36 is oscillated can be reduced, to a limited extent, and by turning the limit screws out, the oscillation angle can be increased, to a limited extent. If the corner portions of either or both of the corner portions 34a, 34b, of the gear-sector plate 34 abuts against one of the limit screws 39a or 39b before the end of the oscillatory movement of the oscillating driving stub shaft 20, the bolt (32a or 32b) will give and its spring will be further compressed. In FIG. 4, the spring of bolt 32a is shown as being compressed to illustrate that the oscillation of the stub shaft 20 has carried the corner 34a of the gear-sector plate 34 slightly beyond the stop established by limit screw 39a.

The orientation of the oscillation angle can be adjusted by turning one of the limit screws in, and the other out, without changing the final size of the angle. As previously indicated, both of the aforesaid adjustments, i.e. the adjustment with respect to the size of the angle of oscillation, and the adjustment with respect to the orientation of the angle, can be made while the equipment is in operation. This is an important feature.

Figure 5:
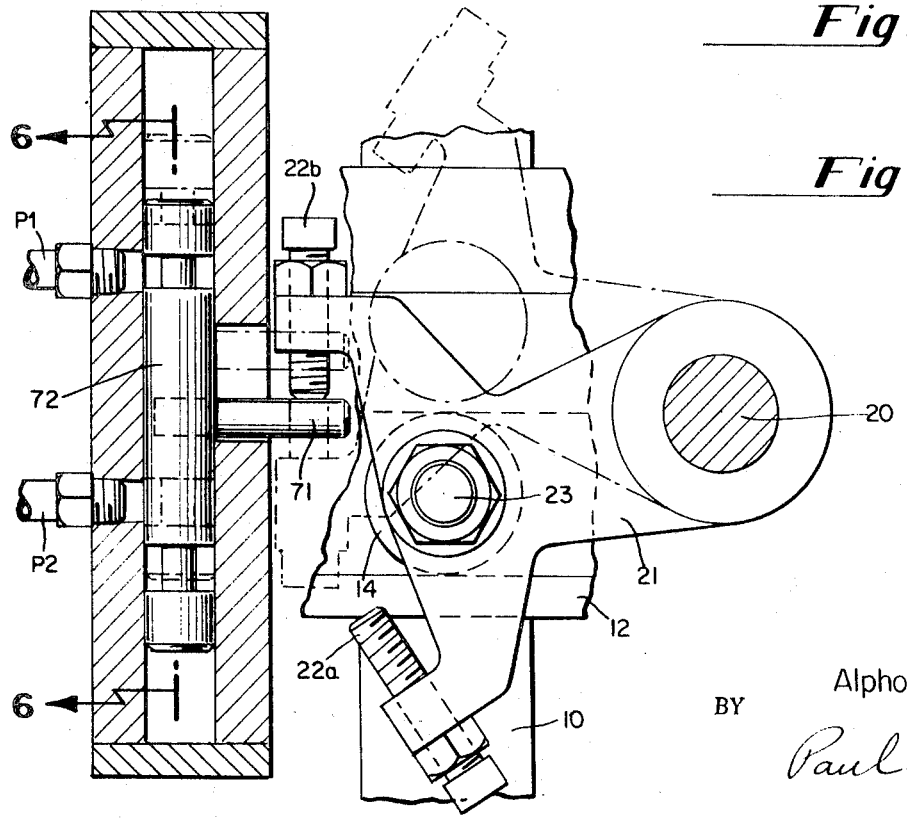
FIG. 5 is a view looking down along the line 5–5 of FIG. 3.

Referring now to FIG. 5, as the yoke 21 is driven back and forth by the cam follower 14, through an angle which is substantially less than 90°, the outer ends of the arms of the yoke, through adjustable pusher pins 22a and 22b, engage and move a pneumatic valve-spool shift lever 71 back and forth. This action thus takes place in proper time relationship with the oscillatory movement of the vertical drive shaft 40 and oscillatory movement of the fluid motor assembly 50 mounted thereon.

Figure 6:
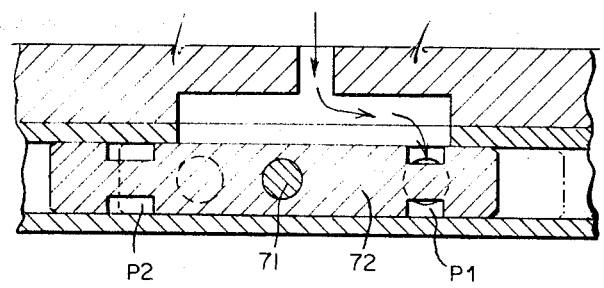
FIG. 6 is a diagrammatic view in section looking along the line 6–6 of FIG. 3 and shows the parts and air passages of the pneumatic valve.

In the drawing, the various component parts are shown in the position they would assume when the fluid motor assembly 50 is in the position shown in solid lines in FIG. 1. In this position, the piston 51 of the fluid motor assembly faces the bottleware B on the dead plate. In FIG. 5, and as also shown in FIG. 6, the air is being directed out of port P1 to drive the piston 51 to its outward or extended position. When the cam follower roller 14 moves in a direction to turn the yoke 21 clockwise, as viewed in FIG. 5, the stub shaft 20, output shaft 40, and fluid motor assembly 50, are rotated clockwise, but the valve-spool 72 remains in the position shown in FIG. 5, and the piston 51 remains in its extended position, until the pusher pin 22a engages the spool shift lever 71. This occurs near the end of the 90° angular movement of the output shaft 40 and fluid motor assembly 50. The pusher pin 22a now pushes the shift lever 71 and spool 72 to their other positions, and the air is now shifted from port P1 to port P2.

Figure 7:
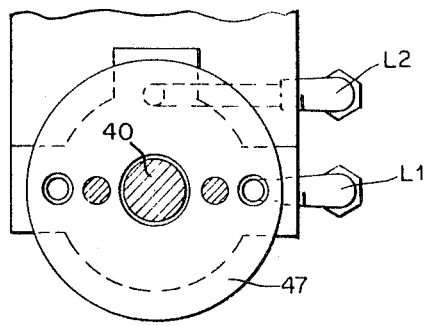
FIG. 7 is a diagrammatic view looking down along the line 7–7 of FIG. 2 showing the ports and air passages at the base of the fluid motor.

Referring now to FIG. 7, the air from port P1 of FIG. 6 flows through an air line L1 up to the base 47 on which the fluid motor assembly rests. So long as the baseplate 47 is in the position shown in FIG. 7, at which position the piston 51 faces the dead plate 62, air flows into the fluid motor in a direction to extend the piston. When the oscillating shaft 40 and baseplate 47 rotate 90° clockwise from the position shown in FIG. 7, and, the shift lever 71 shifts the valve spool to its other position, the air passes out of port P2 (FIG. 5) and through line L2 to the baseplate 47. The air now flows in a direction to retract the piston 51 from its extended position. The cycle is completed by the return movement of the oscillating output shaft 40 which returns the fluid motor assembly to its original position, shown in solid lines in FIG. 1.

In the embodiment illustrated, the fluid motor assembly 50 includes a mounting plate 57 which has built-in reversible valving and air ducts and which may be pivoted to either one of two positions to allow the same fluid motor unit to be used for either right-hand or left-hand transfer to a moving conveyor belt. Such reversible feature is shown and described in my copending application, Ser. No. 744,263, filed June 17, 1968, entitled "Push Out for Glassware Forming Machinery."

With the exception of the main drive cam 12, the component parts of the gear drive mechanism illustrated and described herein (see for example, FIG. 3) are supported on or housed within a common housing 80. The upper portion of the housing 80 includes a bracket portion 81 which is adapted to be bolted to the frame 65 of the conveyor, and the lower portion of the housing includes a bracket portion 82 having a bearing therein which is adapted to be supported on the main drive shaft 10.

What I claim is:

1. Apparatus for operative association with glassware-forming equipment having pushout mechanism adapted to sweep newly formed glassware from a dead plate to a moving conveyor in oscillatory cyclical motions, said glassware-forming equipment having a main drive shaft, means for driving said main drive shaft rotationally in one direction, and an output shaft on which said pushout mechanism is mounted, said main drive shaft and said output shaft being normal to each other, said apparatus comprising:
  a. a cam having a cam-follower groove therein, said cam adapted to be mounted on said main drive shaft;
  b. a cam follower adapted to be received in said groove and to be moved in reciprocating manner by rotation of said cam on said main drive shaft,
  c. a housing,
  d. a stub shaft supported in said housing,
  e. a first lever arm fixed to said stub shaft and connected to said cam follower, said first lever arm being movable pivotally by said cam follower in reciprocating manner to oscillate said stub shaft through an angle substantially less than 90°,
  f. a second lever arm fixed to said stub shaft and pivotal in oscillating manner therewith,
  g. a gear sector supported free on said stub shaft and engaged by said second lever arm for pivotal movement through an angle substantially less than 90°,
  h. a gear mounted on said output shaft and in mesh with said gear sector, said gear having a radius substantially smaller than the projected radius of said gear sector, whereby pivotal movement of said gear sector in oscillatory manner rotates said gear in oscillating fashion through an angle of approximately 90°.

2. Apparatus according to claim 1 characterized in that said gear sector carries first and second spring-loaded means which are alternately driven by said second lever arm for driving said gear sector pivotally back and forth in oscillating fashion in response to the oscillating motion of said stub shaft, and further characterized in that first and second limit stop means are provided for establishing the limits of movement of said gear sector within the limits of said spring-loaded means.

3. Apparatus according to claim 2 characterized in that said gear sector has first and second spaced-apart depending portions and in that said spring-loaded means comprise first and second spring-loaded bolts carried respectively in said first and second depending portions.

4. Apparatus according to claim 3 further characterized in that said limit stop means comprise a pair of spaced-apart adjustable stop screws mounted in said housing.

5. Apparatus according to claim 4 characterized in that a pneumatic valve is provided for controlling the supply of air to said pushout mechanism, and in that said valve is supported on said housing and has a valve spool therein and a shift lever projecting therefrom for adjusting the position of said spool within said valve, and further characterized in that said first lever arm on said stub shaft is a yoke the arms of which alternately engage said valve-spool shift lever for moving said spool back and forth in timed relation with the oscillatory movement of said stub shaft.

6. Apparatus according to claim 5 further characterized in that each of the arms of said yoke carries an adjustable pin for engaging said valve-spool shift lever.

7. Apparatus according to claim 6 characterized in that said gear is mounted free on said output shaft and in that a safety clutch is provided to connect said gear to said output shaft.

8. Apparatus according to claim 7 characterized in that said housing is provided with bracket means for securing the upper part of said housing to the frame of said conveyor, and is provided with bearing means for supporting the lower part of said housing on said main drive shaft.

9. Apparatus for operative association with glassware forming equipment having pushout mechanism adapted to sweep newly formed glassware from a dead plate to a moving conveyor in oscillatory cyclical motions, said glassware forming equipment having a main drive shaft, means for driving said main drive shaft rotationally in one direction during operation of the equipment, a drive cam on said main drive shaft, and an output shaft on which said pushout mechanism is mounted, said main drive shaft and said output shaft being normal to each other, said apparatus comprising:
  a. a housing,
  b. a stub shaft supported in said housing,
  c. a first lever arm fixed to said stub shaft,
  d. a cam follower connected to said first lever arm and adapted to move said arm pivotally and in reciprocating manner to oscillate said stub shaft through an angle substantially less than 90°,
  e. a second lever arm fixed to said stub shaft and pivotal in oscillating manner therewith,
  f. a gear sector supported free on said stub shaft and engaged by said second lever arm and adapted to be moved pivotally and in reciprocating manner through an angle substantially less than 90°,
  g. an output shaft supported in said housing, and
  h. a gear mounted on said output shaft and in mesh with said gear sector,
  i. said gear having a radius substantially smaller than the projected radius of said gear sector, whereby pivotal movement of said gear sector in oscillatory manner rotates said gear in oscillating fashion through an angle of approximately 90°.

10. Apparatus according to claim 9 characterized in that said gear sector carries first and second spring-loaded means which are alternately driven by said second lever arm for driving said gear sector pivotally back and forth in oscillating fashion in response to the oscillating motion of said stub shaft, and further characterized in that first and second adjustable limit stop means are mounted in said housing for engaging said gear sector near the limits of its oscillations for establishing the limits of movement of said gear sector.

11. Apparatus according to claim 10 characterized in that said pushout mechanism includes a fluid motor, in that a pneumatic valve is provided for controlling the supply of air to said fluid motor and in that said valve is supported on said housing and has a valve spool therein and a shift lever projecting therefrom for adjusting the position of said spool within said valve, and further characterized in that said first lever arm on said stub shaft is a yoke the arms of which alternately engage said valve-spool shift lever for moving said spool back and forth in timed relation with the oscillatory movement of said stub shaft.